(12) United States Patent
Rosenthal

(10) Patent No.: US 10,850,359 B2
(45) Date of Patent: Dec. 1, 2020

(54) INDEXING TOOL

(71) Applicant: Timm Robert Rosenthal, Wisconsin Rapids, WI (US)

(72) Inventor: Timm Robert Rosenthal, Wisconsin Rapids, WI (US)

( * ) Notice: Subject to any disclaimer, the term of this patent is extended or adjusted under 35 U.S.C. 154(b) by 398 days.

(21) Appl. No.: 15/934,374

(22) Filed: Mar. 23, 2018

(65) Prior Publication Data
US 2018/0281141 A1    Oct. 4, 2018

Related U.S. Application Data

(60) Provisional application No. 62/478,104, filed on Mar. 29, 2017.

(51) Int. Cl.
| | | |
|---|---|---|
| B23Q 15/26 | (2006.01) | |
| B23Q 16/02 | (2006.01) | |
| B23Q 3/18  | (2006.01) | |
| B25H 7/00  | (2006.01) | |
| B23Q 3/10  | (2006.01) | |

(52) U.S. Cl.
CPC ........... *B23Q 16/021* (2013.01); *B23Q 3/186* (2013.01); *B23Q 15/26* (2013.01); *B25H 7/005* (2013.01); *B23Q 3/104* (2013.01)

(58) Field of Classification Search
CPC ...... B23Q 15/26; B23Q 16/021; B23Q 3/186; B23Q 3/104; B25H 7/005; Y10S 269/902
USPC ............................ 269/246, 71, 74, 76, 902
See application file for complete search history.

(56) References Cited

U.S. PATENT DOCUMENTS

| | | | | |
|---|---|---|---|---|
| 573,287 | A | * | 12/1896 | Pittis ....................... B25B 1/103 269/246 |
| 1,705,629 | A | | 3/1929 | Wildbore |
| 2,024,111 | A | * | 12/1935 | Phillis ....................... B25B 1/20 269/87.2 |
| 2,371,831 | A | | 3/1945 | Leming |
| 2,422,773 | A | | 6/1947 | Colwill |
| 2,585,594 | A | * | 2/1952 | Snyder ................... B23Q 3/104 269/82 |
| 3,553,908 | A | | 1/1971 | Boehm |
| 3,789,509 | A | | 2/1974 | Harkness |
| 3,812,747 | A | | 5/1974 | Werth |
| 3,824,744 | A | | 7/1974 | Petrant |
| 3,827,119 | A | | 8/1974 | Bennett |
| 3,935,730 | A | | 2/1976 | Luongo et al. |
| 3,980,287 | A | | 9/1976 | Nilsson |
| 4,151,984 | A | * | 5/1979 | Zapart .................... B23Q 3/104 269/246 |
| 4,466,193 | A | * | 8/1984 | Astle ...................... B25H 7/005 33/21.1 |
| 4,526,437 | A | * | 7/1985 | Kies ......................... H01R 4/36 439/810 |
| 4,649,616 | A | * | 3/1987 | Bricker ................... B22C 21/14 164/397 |

(Continued)

*Primary Examiner* — Joseph J Hail
*Assistant Examiner* — Arman Milanian
(74) *Attorney, Agent, or Firm* — James Earl Lowe, Jr.

(57) ABSTRACT

An indexing tool for positioning a workpiece, the tool comprising a block having sides, the sides defining a regular polygon. The block has a central opening, and a threaded hole extending at a right angle to the central opening and into and through one of the sides. The block also has a V notch in the block wall opposite the threaded hole, the threaded hole being adapted to have received therein a like threaded set screw.

7 Claims, 4 Drawing Sheets

(56) References Cited

U.S. PATENT DOCUMENTS

| | | | | |
|---|---|---|---|---|
| 4,671,141 | A | * | 6/1987 | Hanson ................. B25B 13/065 81/441 |
| 5,136,909 | A | * | 8/1992 | Mellick ................ B23D 51/025 269/287 |
| 5,138,917 | A | * | 8/1992 | Kirschner ............... B25B 5/101 81/164 |
| 5,494,462 | A | * | 2/1996 | Auclair ................... H01R 4/36 411/300 |
| 5,730,643 | A | | 3/1998 | Bartlett et al. |
| 5,863,035 | A | * | 1/1999 | Howell .................... B25B 5/10 254/100 |
| 6,875,045 | B1 | * | 4/2005 | Hollick ................. H01R 4/363 439/411 |
| D536,229 | S | * | 2/2007 | Clark ............................... D8/72 |
| D703,519 | S | * | 4/2014 | Senseney ...................... D8/382 |

* cited by examiner

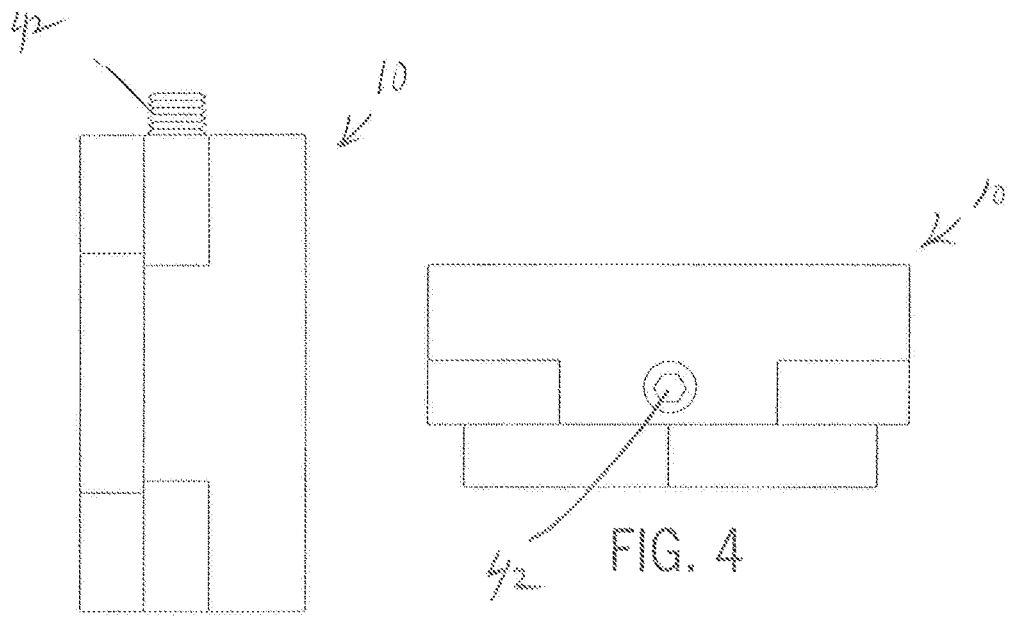
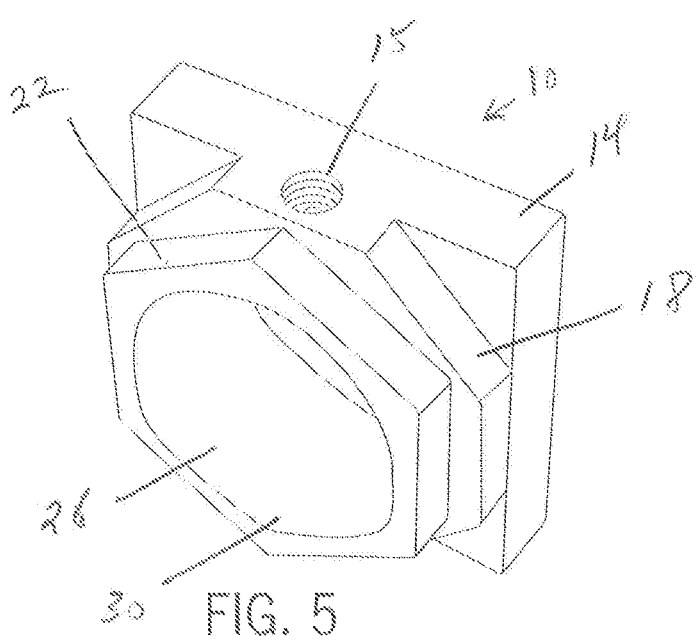

INDEXING TOOL

FIELD OF THE INVENTION

The present disclosure relates generally to an indexing tool to be employed in connection with but not limited to machining operations.

BACKGROUND OF THE INVENTION

An indexing tool is a time saving tool for use by machinists, tool makers and individuals and other similarly allied trades. More particularly, an indexing tool positions articles such as workpieces, and acts as a positioning system to enable the simple convenient and accurate positioning of a work piece in a work support, with the accurate positioning of the workpiece permitting accurate machining of the workpiece, in the desired fashion. Machining, as used herein, is any of various processes in which a piece of raw material is cut into a desired final shape and size by a controlled material-removal process. Work piece, as used herein, is a piece of metal or other material that is in the process of being worked on or made or has actually been cut or shaped by a hand tool or machine.

More particularly, when working on a workpiece, it is often necessary to hold the piece while machining a feature, such as drilling a hole, into the piece. It is also common to then have to move or index the work piece, so another hole can be drilled into the workpiece. In some instances, the workpiece also needs to be rotated a particular amount, so that the next hole can be drilled at an angle relative to the prior hole.

In most cases, the amount of rotation is an equal part of 360°. In other words, 45°, 90°, or 60°, for example, with several equal amounts of rotation needed to place two or more holes into a round rod, for example.

Current solutions provided for holding the work piece, and then rotating the work piece, are difficult to use, and expensive. There is therefore a need for a less expensive method of holding or referencing a workpiece, and for being able to index and rotate the work piece with a less expensive and easy to use tool.

SUMMARY OF THE INVENTION

Disclosed is an indexing tool for positioning a workpiece, the tool comprising a block having sides, the sides defining a regular polygon. The block has a central opening, and a threaded hole extending at a right angle to the central opening and into and through one of the sides. The block also has a V notch in the block wall opposite the threaded hole, the threaded hole being adapted to have received therein a like threaded set screw.

BRIEF DESCRIPTION OF THE DRAWINGS

FIG. 3 is a right side view of the indexing tool of FIG. 1.

FIG. 4 is a top view of the indexing tool of FIG. 1.

FIG. 5 is a top right perspective view of the indexing tool of FIG. 1.

Figure 1:
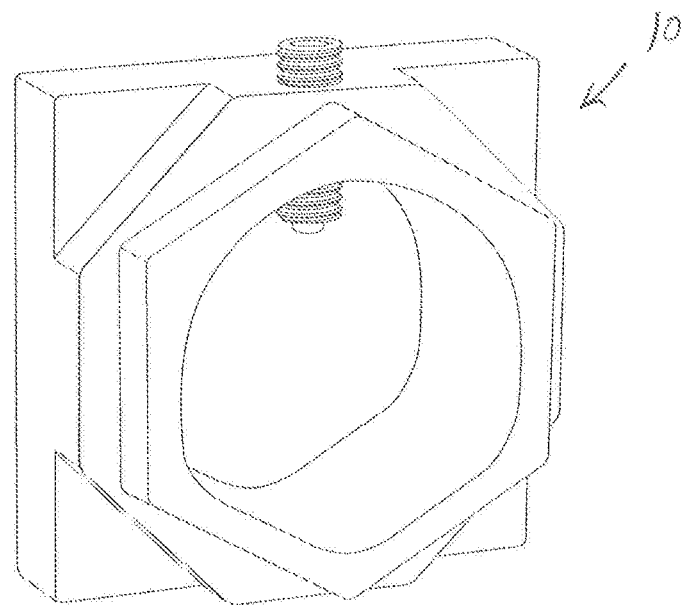
FIG. 1 is a top left perspective view of an indexing tool according to this disclosure.
Figure 2:
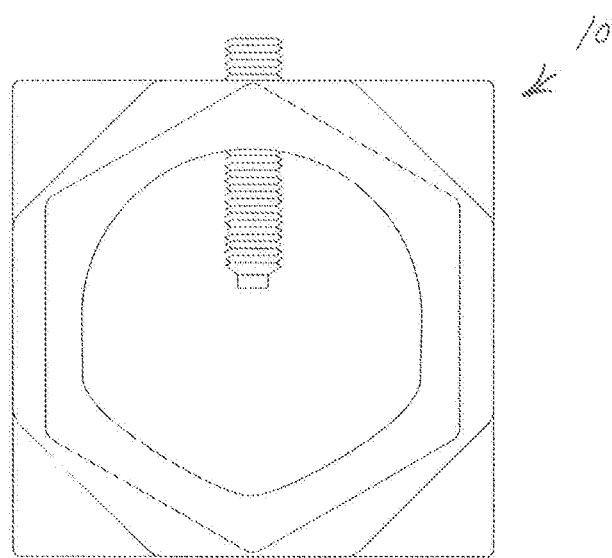
FIG. 2 is a front view of the indexing tool of FIG. 1.

Before one embodiment of the disclosure is explained in detail, it is to be understood that the disclosure is not limited in its application to the details of the construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward", "downward", "side", "top" and "bottom", etc., are words of convenience and are not to be construed as limiting terms.

DETAILED DESCRIPTION

An indexing tool 10 according to this disclosure comprises a block with one or more portions whose sides are a regular polygon. A regular polygon is a polygon having all its sides equal and all the angles equal. The measure of each angle of a regular polygon with n sides is given as 360/n degrees. And a circumscribed circle can be drawn through all the vertices of a regular polygon.

Figure 6:
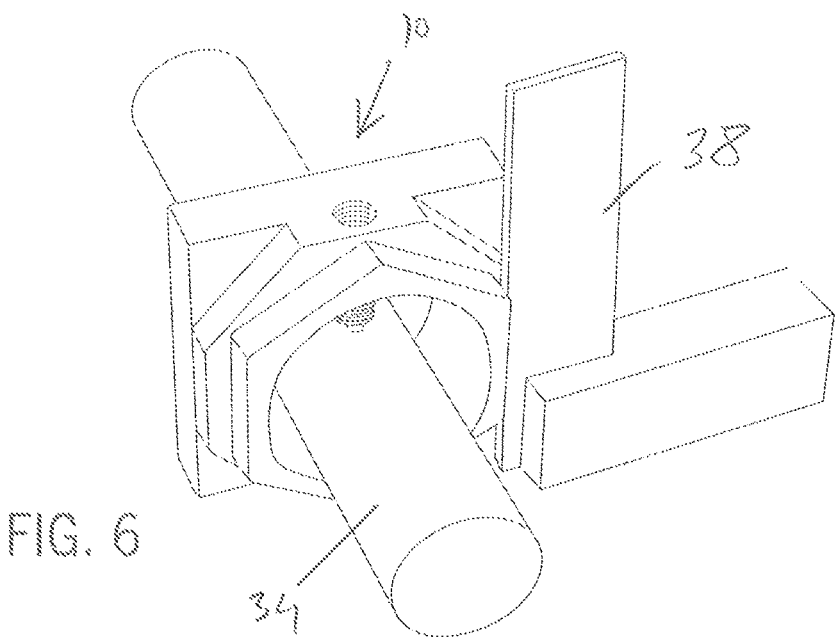
FIG. 6 is a top perspective view of the indexing tool of FIG. 1 positioned adjacent a vertical support, like a right angle tool, with a work piece in the form of a rod, received therein.
Figure 7:
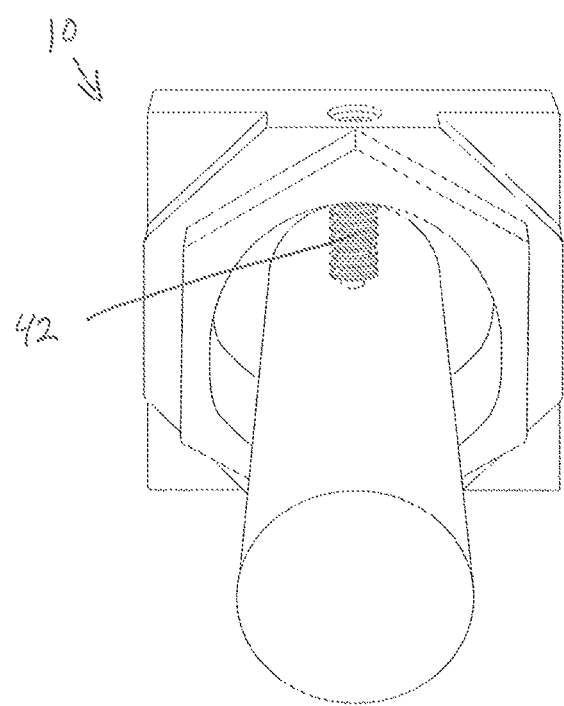
FIG. 7 is a front perspective view of the indexing tool of FIG. 2 showing a set screw in contact with the rod.

More particularly, illustrated in FIGS. 1 to 7 is the indexing tool 10 for positioning a workpiece, such as a rod 34, the tool 10 comprising: a block having sides, the sides defining a regular polygon. The block has a central opening 26, a threaded hole 15 extending at a right angle to the central opening 26 and into and through one of the sides. The block has a V notch 30 in the block wall opposite the threaded hole 15. The threaded hole 15 is adapted to have received therein a like threaded set screw 42, as shown in FIG. 7.

The central hole 26 extends along a longitudinal length of the tool 10, and in one embodiment, the tool 10 has a plurality of portions along its longitudinal length, each portion having sides defining a regular polygon, with each portion defining a regular polygon different from the other portions.

For example, in one embodiment, in one portion, the regular polygon is a square 14. In another portion, the regular polygon is a hexagon 22. And in still another portion, the regular polygon is an octagon 18.

In use, the indexing tool 10 will be typically positioned alongside of a flat vertical surface, like that provided by a right angle tool 38, such as shown in FIG. 6. Even more frequently, the indexing tool 10 may be held in a clamp (not shown). After the work piece 34 is in place, the work piece 34 is held by a vise or other work holding fixture (not shown), with the indexing tool 10 either still attached or removed from the work piece. After holding the work piece 34, and a first hole (not shown) being drilled into a rod 34, the clamp is loosened, and the indexing tool 10 is then rotated, while the rod 34 remains secured inside the tool. Depending on whether a new hole needs to be drilled into the rod at 90° or at 45°, for example, the appropriate side of one of the portions of the indexing tool 10 is selected.

In order to connect the indexing tool 10 to the rod 34, for example, the set screw 42 is loosened. The indexing tool 10 is moved along the rod 34 to a desired position. The set screw 42 is then threaded into the indexing tool 10 so that the end of the set screw 42 engages the rod 34. The rod 34 is then held in the V-shaped notch 30 of the central opening 26. This provides two contact points (not shown) in the notch 30 that contact the rod 34. The V-shaped notch 30 can accommodate various diameters of rods, and the central opening 26 is oversized so that it can accommodate a variety of different diameter rods (not shown) or other shape work pieces within the central opening. Different indexing tools with different size central openings, however, must be provided for substantial differences in rod diameter.

In operation, the work piece 34 is supported by a different means; typically a vise or fixture (not shown). The indexing tool 10 is designed to be a reference tool that allows for simple manipulation of the work piece generally by unclamping the holding mechanism (vise/fixture) and rotating/indexing the workpiece, and then re-clamping the workpiece. It can also be removed and put back on the workpiece for clearance issues or any other need for repositioning.

Figure 8:
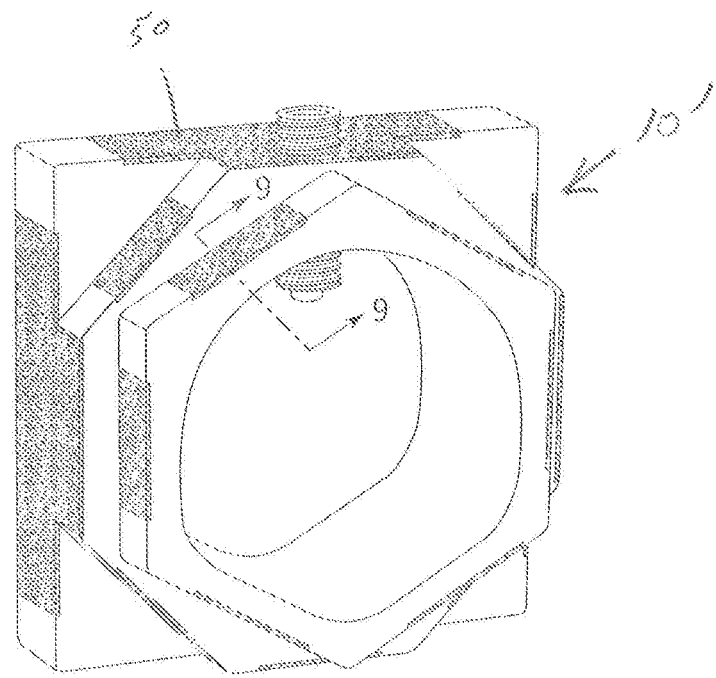
FIG. 8 is a top left perspective view of another embodiment of an indexing tool according to this disclosure.
Figure 9:
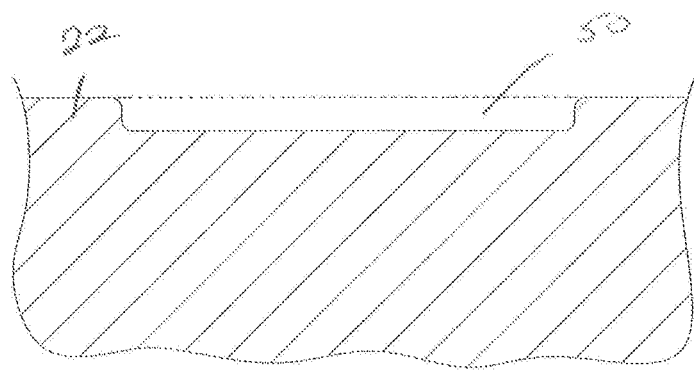
FIG. 9 is a partial cross section of the indexing tool of FIG. 8, taken along the line 9-9 in FIG. 8.

In another embodiment, as illustrated in FIGS. 8 and 9, an indexing tool 10' is identical to the indexing tool 10, except for the addition of various reliefs 50 added to some of the surfaces of the tool 10'. The reliefs 50 allow for some stretching of the tool metal in some applications.

Various other features of this disclosure are set forth in the following claims.

The invention claimed is:

1. An indexing tool for positioning a workpiece, the tool comprising: a block having sides, the sides defining a regular polygon, the block having a central opening, a threaded hole extending at a right angle to the central opening and into and through one of the sides, and the block has a V notch in a block wall opposite the threaded hole, the threaded hole being adapted to have received therein a like threaded set screw wherein the central hole extends along a longitudinal length of the tool, and wherein the tool has a plurality of portions along its longitudinal length, each portion having sides defining a regular polygon, with each portion defining a regular polygon different from the other portions.

2. An indexing tool according to claim 1, wherein the regular polygon is a hexagon.

3. An indexing tool according to claim 1, wherein the regular polygon is a octagon.

4. An indexing tool according to claim 1, wherein the regular polygon is a square.

5. An indexing tool according to claim 4 wherein a portion of the outer surface has at least one relief therein.

6. An indexing tool for positioning a workpiece, the tool comprising: a block having sides defining an outer surface, the sides defining a regular polygon, the block having a central opening, a threaded hole extending at a right angle to the central opening and into and through one of the sides, and the block has a V notch in a block wall opposite the threaded hole, the threaded hole being adapted to have received therein a like threaded set screw, wherein the central hole extends along a longitudinal length of the tool, and wherein the tool has a at least a first portion, a second portion and a third portion along its longitudinal length, each portion having sides defining a regular polygon, wherein the first regular polygon is a hexagon, wherein the second regular polygon is a octagon, and wherein the third regular polygon is a square.

7. An indexing tool according to claim 6 wherein a portion of the outer surface has at least one relief therein.

* * * * *